United States Patent [19]

Takeda

[11] Patent Number: 4,605,845
[45] Date of Patent: Aug. 12, 1986

[54] DETECTABLE CARD AND ENTRY AND DEPARTURE CHECKING APPARATUS UTILIZING THE SAME

[76] Inventor: Shigekazu Takeda, 21-9, Nishimine-machi, Ohta-ku, Tokyo, Japan

[21] Appl. No.: 555,212

[22] Filed: Nov. 22, 1983

[30] Foreign Application Priority Data

Dec. 14, 1982 [JP] Japan .............................. 57-187941[U]
Feb. 14, 1983 [JP] Japan .............................. 58-19067[U]

[51] Int. Cl.⁴ ............................................... G06K 5/00
[52] U.S. Cl. ....................................... 235/382; 235/487
[58] Field of Search ............................... 235/382, 487; 343/6.555

[56] References Cited

U.S. PATENT DOCUMENTS 3,810,147  5/1974  Lichtblau ........................ 343/6.555
3,863,244  1/1975  Lichtblau ........................ 343/6.555
4,058,839  11/1977  Darjany ............................. 235/488

*Primary Examiner*—Harold I. Pitts
*Attorney, Agent, or Firm*—Wenderoth, Lind & Ponack

[57] ABSTRACT

A detectable card is constituted by a sheet substrate made of a synthetic resin, a first capacitor including a pair of electrodes bonded to opposite surfaces of the substrate at the central portion, a second capacitor including a pair of electrodes bonded to the opposite surfaces of the substrate at the peripheries thereof, a spiral connector interconnecting a central electrode and peripheral electrode disposed, the spiral connector forming an inductance of an LC tuning circuit. The assembly is sealed in a cover made of inner and outer synthetic resin films. The card may also be provided with a plurality of LC tuning circuits having different tuning frequencies, and the card may be used in an entry and departure checking apparatus comprising a sweep signal generator for producing sweep signals adapted to sweep the LC tuning circuits, a tuning point detector supplied with an output of the sweep signal generator for producing a binary code constituted by a plurality of bits corresponding to the status of the LC tuning circuits and a register for converting the binary code into a decimal value, and a selector responsive to the decimal value for operating a gate in a way of either inhibiting or permitting passage of a person carrying the card.

8 Claims, 7 Drawing Figures

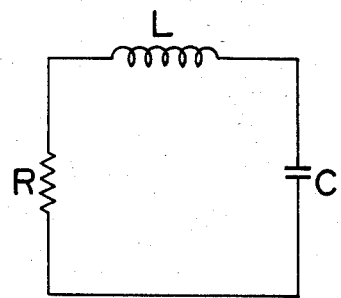
FIG_1
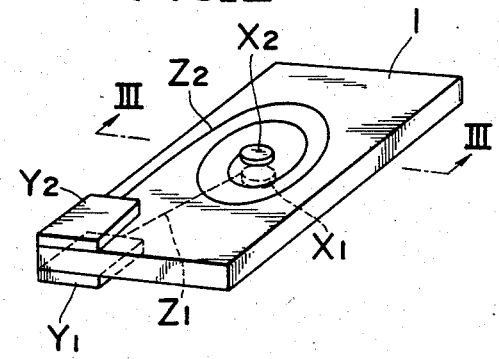
FIG_2
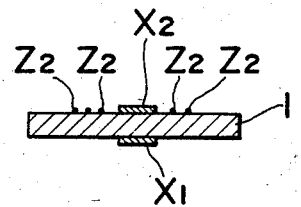
FIG_3

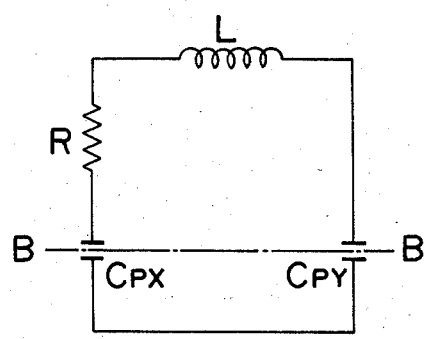
FIG_4
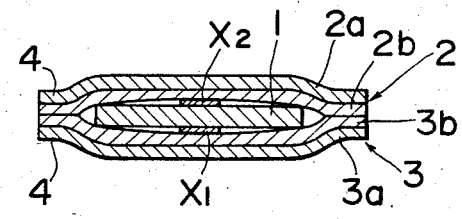
FIG_5
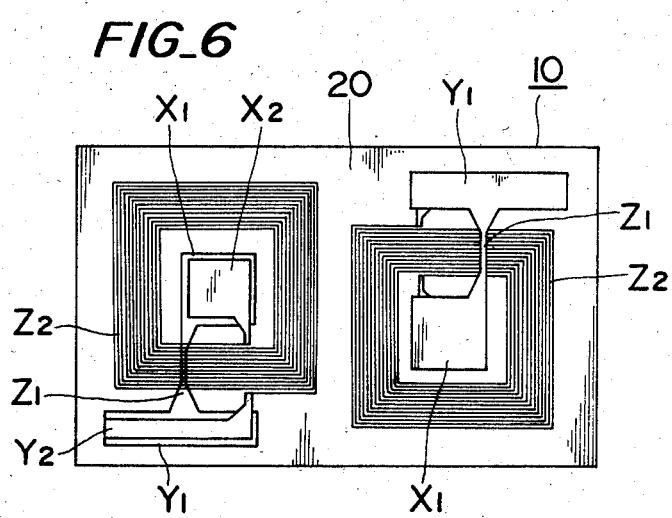
FIG_6

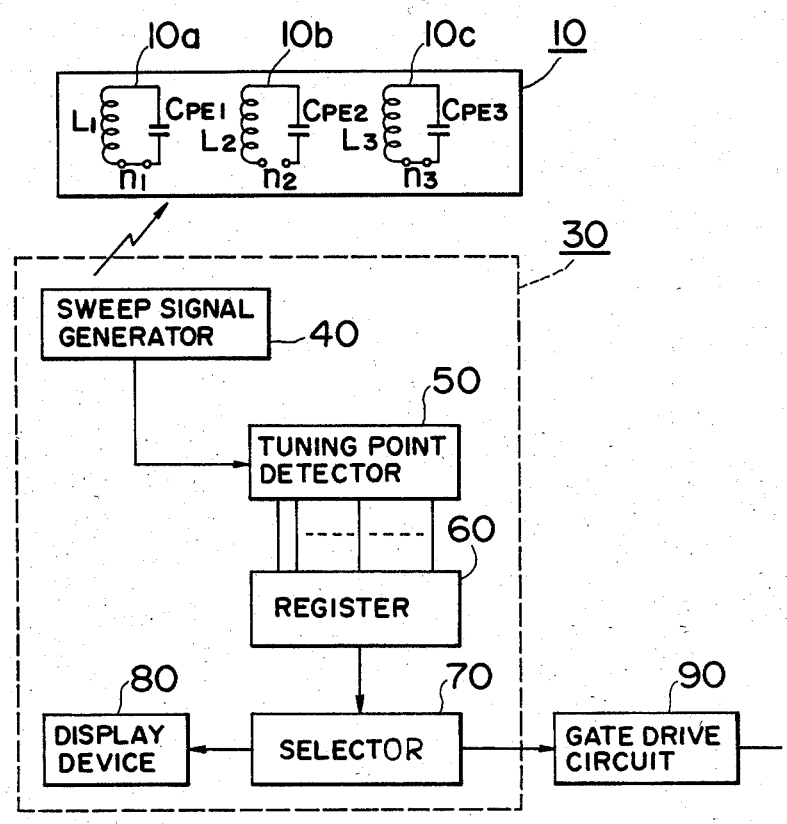
FIG_7

DETECTABLE CARD AND ENTRY AND DEPARTURE CHECKING APPARATUS UTILIZING THE SAME

BACKGROUND OF THE INVENTION

This invention relates to a detectable card containing a plurality of LC tuning circuits and an entry and departure checking apparatus utilizing the same, and more particularly to a detectable card containing a plurality of LC tuning circuits the presence of which can be detected when at least one of said LC circuits is caused to sense the previously designated resonance frequency of an electric wave, and to an entry and departure checking apparatus utilizing the same.

A prior art card comprises a simple LC tuning circuit made up of an inductance L, a capacitance C and a resistor R, as shown in FIG. 1, and these impedance elements are sandwiched between simple covers.

When a customary detectable card having such construction is caused to sense the resonance frequency of an electric wave emitted from an electric wave transmitting and receiving apparatus, not shown, installed at an exit of a shop, the electric wave transmitting and receiving apparatus may produce an interference noise eventually to send an alarm signal or to detect the state of an absorbed electric wave energy to produce an electric signal. For this reason an article containing a detectable card provided with such an LC tuning circuit can be detected at the exit of a shop. However, since the prior art detectable card utilizes an ordinary coil and capacitor, the electric circuits are liable to be damaged, thus requiring a large number of manufacturing processes in case of its mass production, which entails large production costs as much. Moreover, as the finished card has a thickness of some extent, it is rather inconvenient to handle and carry with.

An entry control system, meanwhile, has been used in which a person who carries a plastic card having a size of a credit card provided with a magnetic strip can open a door or gate automatically by using the card. More particularly, when a card with a preset code is inserted into pass terminals installed on the inside and outside of a door, the door is caused to open and then automatically closed in accordance with a predetermined mode after a person carrying the card has passed through the door. This system, however, is not convenient because each time a door is to be opened, the person must take out the card and insert it into the pass terminals each time.

In the case of an optical identification card system, it is also necessary to pass the card through a checking device, that is, the card carrier must mount the card on a suitable portion of the body not to intercept a light beam utilized to detect a specific code on the surface of the card. This not only makes troublesome the use of the card but also can be viewed by third persons.

SUMMARY OF THE INVENTION

It is an object of this invention to provide an improved detectable card having a simple construction to be readily detectable with an electric wave of preset resonance frequency.

Another object of this invention is to provide an entry and departure checking apparatus for merchandise utilizing the card just described above.

Still another object of this invention is to provide a novel identification card and an entry and departure checking apparatus which permits or inhibits passage of a person carrying the card with no manipulation of his card required.

According to one aspect of this invention there is provided a detectable card comprising a sheet substrate having a predetermined thickness and dielectric constant and made of a synthetic resin such as polyester resin or polyimide resin, a first equivalent capacitor including a pair of central electrodes bonded, by means of photo etching for example, respectively to opposite surfaces of the substrate at a central portion, a second equivalent capacitor including a pair of peripheral electrodes respectively bonded to opposite surfaces of the substrate at some portion of peripheries thereof, said two capacitors forming an equivalent capacitance of an LC tuning circuit, a spiral conductor interconnecting a central electrode and a peripheral electrode which are disposed on one side of the substrate, the said spiral conductor forming an inductance of said LC tuning circuit, inner films made of a low melting-point synthetic resin and thermally fused to the opposite surfaces of the substrate, and outer films respectively overlying said inner films and made of a high melting-point synthetic film, peripheries of said inner and outer films being hermetically fused together.

According to another aspect of this invention, there is provided an entry and departure checking apparatus comprising a detectable card provided with a plurality of LC tuning circuits each of which has different tuning frequencies, a sweep signal generator for producing sweep signals of oscillation frequencies adapted to sweep the LC tuning circuit of preset tuning frequencies, a tuning point detector to sense a dip in detected current level caused by slightly absorbed oscillation electric wave energy at each tuning point of a plurality of LC tuning circuits being supplied with an output of the sweep signal generator, thereby being constituted to produce a binary code by bits respectively corresponding to status of the LC tuning circuits, and means responsive to the binary code for operating a gate in a way of inhibiting or permitting passage of a person carrying the card.

BRIEF DESCRIPTION OF THE DRAWINGS

In the accompanying drawings:

FIG. 1 is a connection diagram showing an LC tuning circuit utilized in a prior art card;

FIG. 2 is a perspective view showing a sheet substrate of a detectable card embodying the invention;

FIG. 3 is a sectional view taken along a line III—III in FIG 2;

FIG. 4 shows an equivalent circuit of the detectable card shown in FIG. 2;

FIG. 5 is a transverse sectional view of a sheet substrate of the detectable card, which is sealed with a thin cover;

FIG. 6 is a plan view showing a modified card utilizing two LC tuning circuits having different tuning frequencies; and FIG. 7 is a connection diagram showing entry and departure checking apparatus utilizing a card similar to that shown in FIG. 6.

DESCRIPTION OF THE PREFERRED EMBODIMENTS

The detectable card as shown in FIGS. 2, 3 and 5 comprises a sheet substrate 1 having a thickness of about 50μ and made of a polyester resin or a polyimide resin. A main central electrode $X_1$, a counter central electrode $X_2$, a main peripheral electrode $Y_1$ and a counter peripheral electrode $Y_2$ are formed on the opposite surfaces of the substrate, for example, by photoetching. The main central electrode $X_1$ and the main peripheral electrode $Y_1$ on the rear side of the substrate are interconnected by a linear printed wire $Z_1$, while the counter central electrode $X_2$ and the counter peripheral electrode $Y_2$ on the upper side are interconnected by a spiral printed wire $Z_2$ to form an LC tuning circuit. The thicknesses of the electrodes $X_1$, $X_2$, $Y_1$ and $Y_2$ are selected to be about 18μ.

FIG. 4 shows an equivalent circuit of the arrangement shown in FIG. 2 in which $C_{PX}$ and $C_{PY}$ represent the electrostatic capacitances of the capacitors formed between electrodes $X_1$ and $X_2$, and electrodes $Y_1$ and $Y_2$ respectively. As shown in FIG. 4, these capacitors are connected in series with an inductance L and a resistance R, with a line B—B representing the horizontal center line of the sheet substrate 1.

The electrostatic capacitance $C_{PE}$ of the total equivalent capacitor comprising the equivalent circuit is shown by the following equation:

$$\frac{1}{C_{PE}} = \frac{1}{C_{PX}} + \frac{1}{C_{PY}}$$

As shown in FIG. 5, the both sides of the sheet substrate 1 shown in FIG. 2 are covered by upper and lower cover sheets 2 and 3, and the peripheral joint 4 between them is hermetically sealed by applying heat and pressure.

More particularly, a thin cover made up of the upper and lower sheets 2 and 3 comprises outer films 2a and 3a made of a polyester resin and inner films 2b and 3b made of a ethylene-vinyl acetate copolymer as disclosed in my Japanese Utility Model Publication No. 14259/1979. The inner and outer films are laminated to a thickness of about 150μ. After superposing the upper sheet 2 and the lower sheet 3, heat and pressure are applied to their peripheries and the sheet substrate 1. Since the outer films 2a and 3a are made of a polyester resin having a high melting point, they would not be influenced by the heat, but as the inner films 2b and 3b are made of a copolymer of ethylene and vinyl acetate having a low melting point, these films 2b and 3b would be melted by the heat. Thus the inner films 2b and 3b fuse to the sheet substrate 1, and at their peripheries the upper and lower sheets 2 and 3 fuse together to form an air tight peripheral joint 4, thus providing a detectable card of this invention.

Since the card shaped detector of this invention has a laminated thin sheet construction containing an LC tuning circuit, in case of the card being concealed in a high-priced fur or book, it senses the resonance frequency $$\frac{1}{C_{PE}} = \frac{1}{C_{PX}} + \frac{1}{C_{PY}}$$

of an electric wave emitted from an electric wave transmitting and receiving apparatus (not shown) installed at an exit of a shop when the article is brought out at the exit without any legal procedure of payment for it, resulting in that a maximum current flows through the LC tuning circuit. Accordingly, the electric wave reflected by the card is received by the electric wave transmitting and receiving apparatus, thus the detector detecting a tuning point of the resonance frequency to create an alarm signal. Thus, the detectable card of this invention is effective to prevent theft of merchandise.

Although in the illustrated embodiment the capacitors have the definite capacitance, it is clear that the capacitors of any capacitances can be provided by butting down the peripheral electrodes to be formed in different sizes, thus providing different kinds of detectable cards being respectively in response to different resonance frequencies, that can be used for supervising entering and outgoing persons.

As above described according to this invention, there is provided a novel card detectable useful to prevent theft of expensive merchandise and to supervise entering and outgoing persons. Moreover, the card of this invention is characterized by its thinness and light weight, and it is easy to manufacture and use.

FIG. 6 is a plan view showing a modified card utilizing two LC tuning circuits. The substrate 1 has a construction similar to that shown in FIG. 2. In this embodiment, two symmetrical LC tuning circuits are provided, one of which is laid up side down and rotated as much as 180 degrees with respect to the other. Thus, the LC tuning circuits comprise a pair of central electrodes $X_1$, $X_2$ and a pair of peripheral electrodes $Y_1$, $Y_2$ on the opposite surfaces of the substrate 1. The electrodes $X_1$ and $Y_1$ at one side and $X_2$ and $Y_2$ at the other side are respectively interconnected by a linear wire $Z_1$ and a spiral wire $Z_2$ which are printed on the substrate 1.

Although not shown, the modified card is also covered with composite films of synthetic resins which are sealed in the same manner as in the first embodiment.

FIG. 7 is a connection diagram showing an entry and departure checking apparatus utilizing the modified card shown in FIG. 6. The card 10 shown in FIG. 6 comprises three LC tuning circuits 10a, 10b and 10c representing a three-bit binary code and respectively contributed by capacitors $C_{PE1}$, $C_{PE2}$, $C_{PE3}$ and inductances $L_1$, $L_2$ and $L_3$. $n_1$, $n_2$ and $n_3$ are coil terminals respectively provided near the electrodes of the LC tuning circuits, whereby $n_1$ and $n_2$ are in the closed state and $n_3$ is in the open state in this example.

The entry and departure checking apparatus 30 comprises a sweep signal generator 40 for generating three sweeping signals in a bandwidth corresponding to the different resonance frequencies of the three LC tuning circuits 10a, 10b and 10c, and a tuning point detector 50 which operates according to the operating principle of a so-called dip meter.

More particularly, when the oscillation frequency of the sweeping signal generator 40 and any preset frequency of the LC tuning circuits 10a, 10b and 10c coincide with each other, the oscillation electric wave energy is absorbed by the LC tuning circuits concerned, thus becoming weak at the tuning point. Consequently, the tuning point detector 50 detects the tuning points Ta, Tb and Tc corresponding to each tuning frequency of the LC tuning circuits 10a, 10b and 10c respectively to provide a pulse signal which becomes a high level ("1") when a tuning point is detected, but becomes a low level ("0") when no tuning point is detected. These pulses are supplied independently in parallel to a register 60 as a three-bit binary code, thereby being converted into a decimal value representing one of seven combinations for a selection of courses, which is then supplied to a selector 70. The selector 70 is constructed to select either one of seven courses of action, or to check seven different identification items concerning persons with the identified number corresponding to the above input of a decimal value. The output of the selector 70 is supplied to a display device 80 and to a gate drive circuit 90 which opens and closes a gate in accordance with the output of the entry and departure checking apparatus 30 which operates as follows:

Since the LC tuning circuits 10a and 10c of the card 10 are closed, though with the LC tuning circuit 10b being open, the card 10 constitutes a three-bit binary code "101". Accordingly, when a person carrying the card 10 approaches the entry and departure checking apparatus 30, as the variable frequencies of the sweeping signal generated by the sweep signal generator 40 coincide with the tuning frequencies of the LC tuning circuits 10a and 10c contained in the card 10, the tuning points Ta and Tc thereof are detected by tuning point detector 50 and detected signals "1", "0" and "1" are supplied to the register 60. This binary code "101" is converted into a decimal value "5" by the register 60. Then, the selector 70 operates either to select the preset output corresponding to the above decimal value "5", or to check the identification item belonging to a specific group of persons corresponding to the identified number "5". The output of the selector 70 is supplied to the display device 80 to cause it to display "PASS OK". This output is also supplied to the gate drive circuit 90 to cause it to open the gate (not shown), thus permitting the person carrying the card to pass through the gate.

When a person not carrying a specific card 10 of the kind described above approaches the gate, since the tuning point detector 50 of the entry and departure checking apparatus 30 does not detect any tuning point, it sends a detected binary code "000" to the tuning point detector 50. This binary code is then converted into a decimal value "0". The selector 70 then operates either to select the previously designated output corresponding to the above decimal value "0", or to check the identification item belonging to a specific group of persons corresponding to the identified number "0". Thus, the display device 80 displays "PASS INHIBITED", while the gate drive circuit 90 does not open the gate.

As above described, the entry and departure checking apparatus of this invention checks the card carrier so as to permit or inhibit him from passing through a gate. Thus, the card carrier is neither required to present nor manipulate his card, and further, the card itself can not be viewed by a third party.

By increasing the number of LC tuning circuits contained in the card, the number of bits of the binary code available can be increased, which means that the number of differently identified cards can be technically increased, whereby an extension of the limit of the usage of cards for the system concerned may be expected.

What is claimed is:
1. A detectable card shaped detector comprising:
   a sheet substrate having a predetermined thickness and dielectric constant and made of a synthetic resin;
   a first capacitor including a pair of central electrodes bonded to opposite surfaces of said substrate at a central portion thereof;
   a second capacitor including a pair of peripheral electrodes bonded to opposite surfaces of said substrate at peripheries thereof;
   a spiral conductor interconnecting one central electrode and one peripheral electrode which are disposed on one side of said substrate, said spiral conductor forming an inductance of an LC tuning circuit;
   inner films made of a low melting-point synthetic resin and fused to the opposite surfaces of said substrate; and
   outer films respectively overlying said inner films and made of a synthetic film, peripheries of said inner and outer films being hermetically fused together.
2. A card according to claim 1, wherein said substrate is made of a polyester resin or a polyimide resin.
3. A card according to claim 1, wherein said inner films are made of a copolymer of ethylene and vinyl acetate.
4. A card according to claim 1, wherein said second capacitor has a capacitance value which is adjusted by cutting down a portion of said pair of peripheral electrodes.
5. A card according to claim 1, wherein said card is provided with a plurality of additional capacitors and spiral conductors forming a plurality of separate unconnected isolated LC tuning circuits having different tuning frequencies.
6. An entry and departure checking apparatus comprising:
   a sheet substrate having a predetermined thickness and dielectric constant and made of a synthetic resin;
   a plurality of LC tuning circuits having different tuning frequencies, each of said tuning circuits comprising a first capacitor including a pair of central electrodes bonded to opposite surfaces of said substrate at a central portion thereof and a second capacitor including a pair of peripheral electrodes bonded to opposite surfaces of said substrate at peripheries thereof and a spiral conductor interconnecting one central electrode and one peripheral electrode which are disposed on one side of said substrate such that said spiral conductor forms an inductance of its LC tuning circuit;
   a sweep signal generator for producing sweep signals adapted to sweep a range of frequencies including those frequencies of said LC tuning circuits;
   a tuning point detector supplied with an output of said sweep signal generator for producing a binary code having a plurality of bits corresponding to status of said plurality of LC tuning circuits; and
   a means responsive to said binary code for operating a gate for inhibiting or permitting passage of a person carrying said card.
7. An apparatus according to claim 6, wherein some of said plurality of LC tuning circuits are arranged to be closed while the remainder of said LC tuning circuits are arranged to be open, resulting in "1" and "0" with respect to binary code.
8. An apparatus according to claim 6, wherein said means responsive to said binary code for operating a gate comprises a register for converting said binary code into a decimal code and a selector to select a predetermined output responsive to said decimal code for operating said gate and a display device for displaying said selected predetermined output.

* * * * *